United States Patent [19]

Vanderhoof et al.

[11] Patent Number: 5,475,577
[45] Date of Patent: Dec. 12, 1995

[54] ACCESSORY ATTACHMENT PLATE FOR VEHICLE PANELS

[75] Inventors: Troy I. Vanderhoof, Holland; Richard J. Goresch, West Olive, both of Mich.

[73] Assignee: Donnelly Corporation, Holland, Mich.

[21] Appl. No.: 909,782

[22] Filed: Jul. 7, 1992

[51] Int. Cl.⁶ .................................................. F21V 21/02
[52] U.S. Cl. ........................... 362/368; 362/148; 362/396; 248/27.1
[58] Field of Search ................................ 362/74, 148, 366, 362/368, 396, 382, 80, 370, 371, 147; 248/27.1

[56] References Cited

U.S. PATENT DOCUMENTS

| | | | |
|---|---|---|---|
| 2,031,861 | 2/1936 | Simek | 248/27.1 |
| 2,116,750 | 5/1938 | Dashner | 362/74 |
| 2,146,701 | 2/1939 | Peterson | 362/80 |
| 2,567,309 | 9/1951 | Adair et al. | 248/27.1 |
| 2,593,033 | 4/1952 | Johnson | 248/27.1 |
| 2,610,012 | 9/1952 | Mackey et al. | 248/27.3 |
| 2,665,865 | 1/1954 | Bell | 248/27.1 |
| 2,772,406 | 11/1956 | Juergens | 340/472 |
| 2,773,973 | 12/1956 | Hoard et al. | 248/27.1 |
| 2,778,930 | 1/1957 | Harrington et al. | 248/27.1 |
| 2,809,283 | 10/1957 | Spencer | 248/27.1 |
| 2,860,233 | 11/1958 | Johnson, Jr. | 248/27.1 |
| 2,903,570 | 9/1959 | Worden | 248/27.3 |
| 3,109,597 | 11/1963 | Baldwin | 362/308 |

(List continued on next page.)

FOREIGN PATENT DOCUMENTS

| | | | |
|---|---|---|---|
| 223098 | 7/1959 | Australia | 362/365 |
| 253441 | 4/1964 | Australia | 362/365 |
| 484226 | 4/1952 | Canada . | |
| 1176345 | 11/1958 | France | 362/365 |
| 1217465 | 12/1959 | France | 362/264 |
| 1268272 | 6/1961 | France | 362/365 |
| 1283929 | 1/1962 | France | 362/365 |
| 1288739 | 2/1962 | France . | |
| 1304849 | 4/1962 | France | 362/265 |
| 1216724 | 5/1962 | France . | |
| 1195813 | 5/1962 | France | 362/265 |
| 1452709 | 3/1966 | France | 362/365 |
| 1064243 | 8/1959 | Germany | 248/27.1 |
| 1283690 | 11/1968 | Germany | 362/61 |
| 2001708 | 10/1970 | Germany . | |
| 2029914 | 1/1971 | Germany . | |
| 2522629 | 12/1976 | Germany | 362/80 |
| 2915333 | 10/1980 | Germany | 248/27.1 |
| 3013715 | 10/1981 | Germany | 362/364 |
| 3109885 | 9/1982 | Germany | 362/147 |
| 3407367 | 8/1985 | Germany | 248/27.1 |
| 3538682 | 4/1987 | Germany | 362/80 |
| 3827090 | 2/1990 | Germany | 362/74 |
| 54123276 | 4/1962 | Japan | 248/27.3 |
| 54120985 | 11/1989 | Japan | 362/147 |
| 54120984 | 7/1991 | Japan | 362/147 |
| 197810 | 10/1978 | Netherlands | 362/147 |
| 862936 | 3/1961 | United Kingdom | 362/265 |
| 916399 | 1/1963 | United Kingdom . | |
| 1069475 | 5/1967 | United Kingdom | 362/61 |
| 1269091 | 3/1972 | United Kingdom | 362/365 |
| 1301688 | 1/1973 | United Kingdom | 362/80 |
| 1445976 | 8/1976 | United Kingdom | 362/61 |
| 1451580 | 10/1976 | United Kingdom | 362/74 |

Primary Examiner—Ira S. Lazarus
Assistant Examiner—Alan B. Cariaso
Attorney, Agent, or Firm—Price, Heneveld, Cooper, DeWitt & Litton

[57] ABSTRACT

A plate for attaching an accessory to a panel such as a vehicle interior headliner including a molded polymeric frame having a dimension adapted to lie adjacent and span at least one opening formed in a panel to receive the accessory. At least one clamp, pivotally coupled to the frame, is adapted to be actuated from the same side of the panel on which the frame is mounted. The clamp swings through the panel opening and engages the opposite panel surface, locking the frame adjacent the panel opening. The frame includes bosses to receive fasteners attaching an accessory such as a vehicle light. In the alternative, the frame receives a conductive bracket for receiving a light bulb or other accessory, thereby acting as the accessory itself.

22 Claims, 4 Drawing Sheets

U.S. PATENT DOCUMENTS

| | | | |
|---|---|---|---|
| 3,190,092 | 6/1965 | Patriquin | 248/27.1 |
| 3,205,351 | 9/1965 | Walker | 362/74 |
| 3,246,320 | 4/1966 | Houbolt | 362/365 |
| 3,276,014 | 9/1966 | Rueger | 362/365 |
| 3,285,548 | 11/1966 | Matto et al. | 248/27.1 |
| 3,321,731 | 5/1967 | Goldbaum | 439/120 |
| 3,454,250 | 7/1969 | Gley | 248/27.1 |
| 3,590,241 | 6/1971 | Docimo | 362/366 |
| 3,620,401 | 11/1971 | Lund | 248/27.3 |
| 3,656,105 | 4/1972 | Steltzer et al. | 362/80 |
| 3,659,093 | 4/1972 | Rieth | 362/366 |
| 3,664,615 | 5/1972 | Kruger | 248/27.1 |
| 3,708,850 | 1/1973 | Martin | 362/365 |
| 3,852,585 | 12/1974 | Brunger | 362/311 |
| 3,884,441 | 5/1975 | Barry | 248/542 |
| 3,917,938 | 11/1975 | Ferrada et al. | 362/277 |
| 3,966,152 | 6/1976 | Bromberg | 248/27.1 |
| 4,048,491 | 9/1977 | Wessman | 362/364 |
| 4,108,414 | 8/1978 | Grant, Sr. | 248/27.1 |
| 4,250,540 | 2/1981 | Kristofek | 362/368 |
| 4,274,330 | 6/1981 | Witten et al. | 248/27.1 |
| 4,298,912 | 11/1981 | Dearth | 362/66 |
| 4,364,101 | 12/1982 | Brockmeyer | 362/80 |
| 4,419,717 | 12/1983 | Price et al. | 362/148 |
| 4,424,554 | 1/1984 | Woloski et al. | 362/365 |
| 4,431,151 | 2/1984 | Schonasky | 248/27.1 |
| 4,444,369 | 4/1984 | Job | 248/27.1 |
| 4,477,864 | 10/1984 | Van Duyn et al. | 362/311 |
| 4,482,940 | 11/1984 | Brandherm | 362/74 |
| 4,497,014 | 1/1985 | Woloski et al. | 362/150 |
| 4,499,528 | 2/1985 | Hawlitzki | 362/275 |
| 4,702,517 | 10/1987 | Maeda et al. | 296/214 |
| 4,703,400 | 10/1987 | Vescio et al. | 362/80 |
| 4,717,200 | 1/1988 | Krüger | 296/214 |
| 4,727,736 | 3/1988 | Lotz | 248/27.1 |
| 4,733,339 | 3/1988 | Kelsall | 362/366 |
| 4,739,460 | 4/1988 | Kelsall | 362/365 |
| 4,760,500 | 7/1988 | Peng | 362/74 |
| 4,764,851 | 8/1988 | Hartmann | 362/74 |
| 4,807,096 | 2/1989 | Skogler et al. | 362/142 |
| 4,844,533 | 7/1989 | Dowd et al. | 296/214 |
| 4,872,097 | 10/1989 | Miller | 362/365 |
| 5,029,048 | 7/1991 | von Gaisberg et al. | 362/32 |
| 5,045,984 | 9/1991 | Trowbridge et al. | 362/365 |
| 5,070,434 | 12/1991 | Suman et al. | 362/74 |
| 5,239,449 | 8/1993 | Wnuk et al. | 362/80 |

ACCESSORY ATTACHMENT PLATE FOR VEHICLE PANELS

BACKGROUND OF THE INVENTION

This invention relates to mounting plates and particularly to plates for mounting accessories to panels in vehicles.

Traditionally, vehicle accessories such as interior lights and the like were rigidly fastened through the headliner or door panel to metal brackets or C-channels spot welded or otherwise rigidly fastened to sheet metal components of the vehicle passenger compartment. The headliners and/or door panels were often made of flexible material which was partially held in place against the interior panel by the accessory. Because of a trend to make vehicles lighter in weight, many of the C-channels and other mounting brackets were removed from the vehicle. The headliners and/or door panels were then made more rigid to remain in place with the aid of adhesive beads. Although the strength and/or rigidity of panels within the vehicle have been improved, they are still unable to provide the sole mounting surface or substrate for many vehicle accessories.

Associated with the removal of the metal brackets or C-channel used to hang the interior lines and accessories, vehicle designers/manufacturers were limited as to the location of many accessories, most of which were moved to locations where sufficient sheet metal was available to receive the accessory. Designers and engineers lacked a panel assembly which could have the accessories installed quickly at any one of a number of locations independent of sheet metal or channel support. Moreover, the manufacturers did not have a headliner or other interior panel which could be preassembled and shipped.

Efforts to attach accessories to conventional semi-rigid or structural panels require special tools and are difficult to attach since access is needed to both sides of the panel. Extra manpower is needed, particularly when dealing with large area panels such as headliners, because an individual cannot reach both sides of the panel simultaneously to secure the accessory. This results in a slow cycle time for each piece and is inefficient. Lastly, the mounting technique for the accessories did not permit the mounting plate to have a dual function, that is, provide the housing for the accessory or act as the mounting surface for another accessory.

SUMMARY OF THE INVENTION

The instant invention is an apparatus for mounting accessories to a panel wherein a plate is attached to the panel through an opening. The plate is inserted into the opening and locked in place by actuating clamping means from the same side of the panel on which the plate is mounted.

One form of the mounting plate includes a frame adapted to span an opening formed in the panel. The frame includes clamping means, activated from the same side of the panel as the frame, for extending through the opening and engaging the opposite side of the panel, locking the mounting plate over the opening. The clamping means include at least one Z-shaped flange pivotally coupled at one apex of the flange arm to the frame so as to rotate about the pivot point and engage the opposite side of the panel. The frame also includes means for receiving fasteners from an accessory for coupling the accessory to the plate.

In yet another form of the invention, the plate includes a frame adapted to span the opening formed in the panel. Clamps extending from the frame are adapted to extend through the opening and engage the opposite side of the panel to hold the plate in the opening. The plate also includes means for mounting a conductive bracket therein to mount a light bulb. A transparent or translucent cover may be attached directly to the plate.

One form of the panel assembly of the invention includes a panel having generally opposing surfaces and at least one aperture extending therethrough. A plate is disposed over and spans the opening and lies adjacent one surface of the panel. At least one clamp pivotally coupled to the plate extends through the aperture and locks into position against the opposite surface of the panel, pulling the plate against the panel. The clamp includes an actuator for moving the clamp which is located on the same side of the panel as the plate.

Advantages provided by the plate and panel assembly include the ability to install and lock the plate in place from a single side of the panel, decreasing installation time, as well as providing a panel having the plate fixed thereto, allowing the traditional separate components to be shipped and handled as a single component. The molded plate also provides an inexpensive and versatile plate for mounting or acting as a base for accessories. Additional advantages include the versatility of mounting locations using the inventive mounting plate. An accessory may be attached to generally any location without special tools. The invention is especially adapted for use in areas having reduced room behind the panel. The mounting plate has a low profile and may even be installed in the panel as an aftermarket product without removing the panel from the vehicle interior. Moreover, the inventive mounting bracket is adapted to work with panels of various thickness. In most all situations, the mounting plate also provides structural support to the panel where the accessory is attached.

DETAILED DESCRIPTION OF THE PREFERRED EMBODIMENTS

Figure 1:
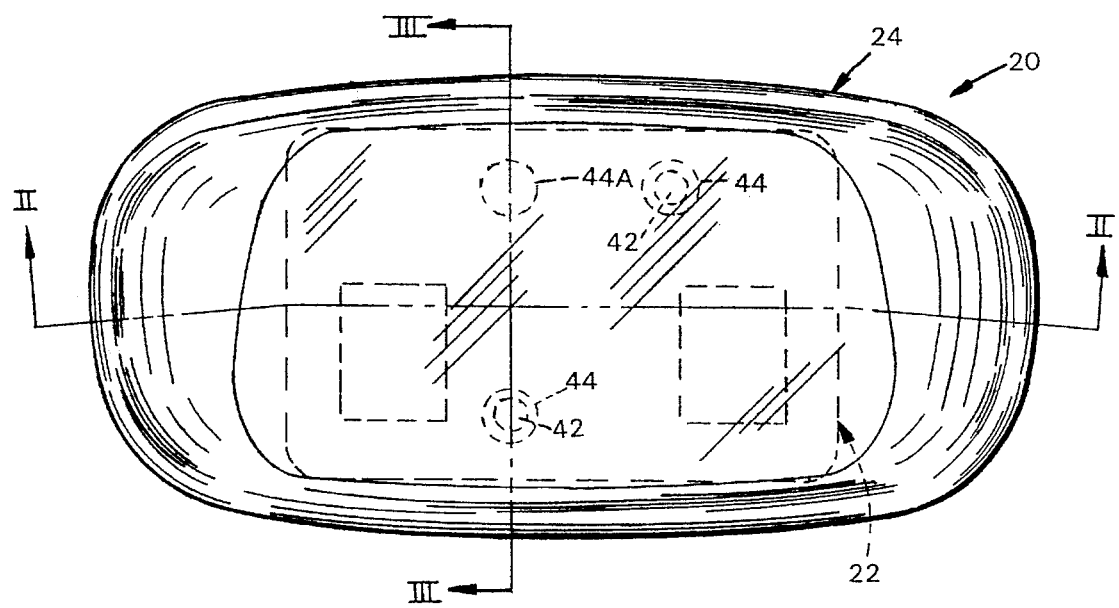
FIG. 1 is a plan view of a panel accessory retained by the plate of the present invention.
Figure 2:
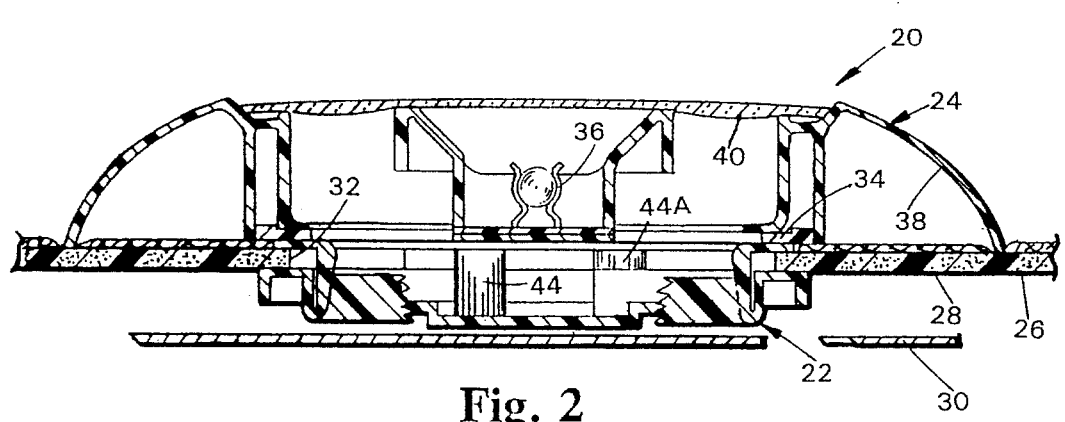
FIGS. 2 and 3 are section views of the panel accessory and plate shown in FIG. 1 taken along lines II—II and III—III of FIG. 1, respectively.
Figure 3:
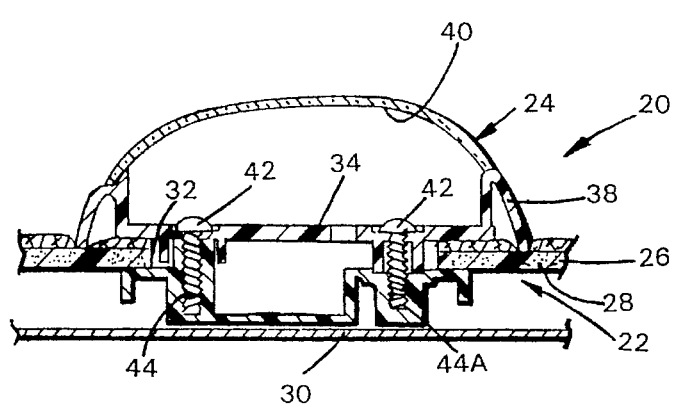

Throughout the following description and reference to the drawing figures, like reference numerals will be used to indicate like components. FIGS. 1–3 generally illustrate one embodiment of a panel assembly 20 having the inventive mounting plate 22 used to attach an accessory 24 such as a dome light assembly to a panel 26. Plate 22 lies adjacent one side 28 of panel 26, such as a structural headliner used to conceal and decorate the interior of a vehicle roof panel 30. Plate 22 has a dimension in at least one direction adapted to span an opening 32 formed in panel 26 in order to couple accessory 24 thereto using a variety of fasteners including screws and/or snaps. For example, accessory 24 (FIGS. 1–3) is a dome light assembly having a base 34 adapted to retain a light bulb 36, enclosed by a decorative bezel 38 supporting a light transmitting lens 40. Dome light 24 is retained against panel 26 by screws 42 (FIGS. 1 and 3) extending through base 34 and into blind bosses 44, 44a extending from or defined in plate 22.

A preferred embodiment of plate 22 (FIGS. 4–10) includes a frame 50 having a shape and contour to conform to the contour of panel 26. Although frame 50 is shown to have a planar, rectangular shape, it may be designed in a number of configurations. Important is its low profile, adapting the plate to fit in small spaces typically provided behind headliners and/or door panels. If desired, plate 22 may be attached to the sheet metal of the vehicle by an adhesive to assist in retaining panel 26 adjacent the mounting surface in the vehicle.

Frame 50 is preferably molded in one piece from a polymeric material such as a 13% glass-filled Nylon designated Type 66 produced by E. I. Dupont Nemours of Wilmington, Del., U.S.A. Other materials may also be used which have characteristics similar to the DuPont Nylon material. The outer margin or perimeter 52, substantially encompassing frame 50, is formed by a channel 54 wherein the outer surface of the channel web 56 is designed to engage panel surface 28 (FIGS. 2–3). Locating tabs 58 may be defined on and extend from the outer surface of web 56 to locate plate 22 with respect to opening 32 in panel 26. In a preferred embodiment, two such locating tabs are formed at opposite corners of plate 22.

The interior 60 of plate 22 is recessed with respect to the outer surface of channel web 56, wherein walls 62 are defined and support an end wall 64 partially closing one side of plate 22 opposite surface 56. End wall 64 also provides a support surface from which blind bosses 44, 44a extend, as mentioned above.

Figure 4:
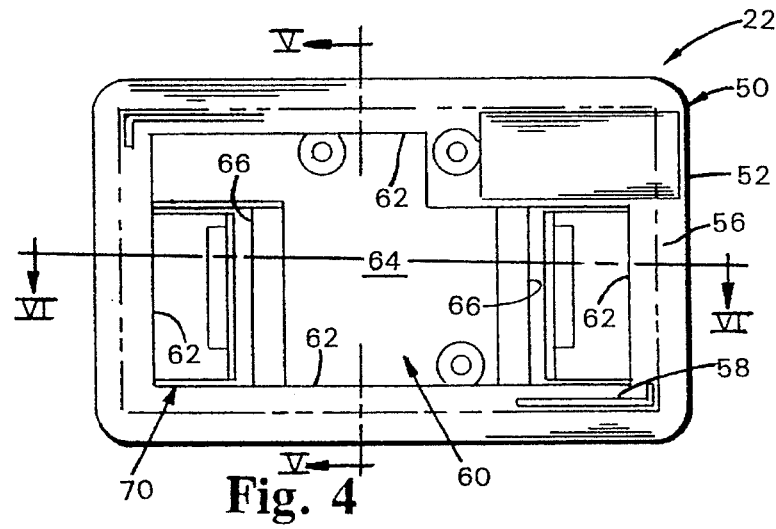
FIG. 4 is a plan view of the plate of the invention.
Figure 5:
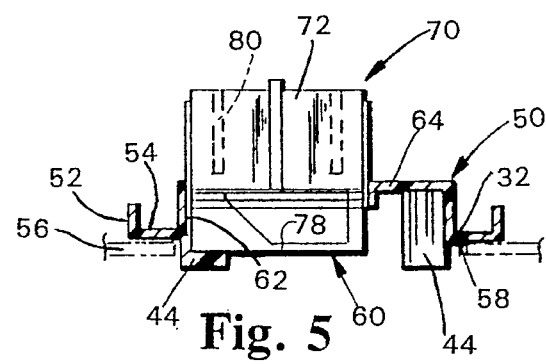
FIGS. 5 and 6 are section views of the plate taken along lines V—V and VI—VI in FIG. 4.
Figure 7:
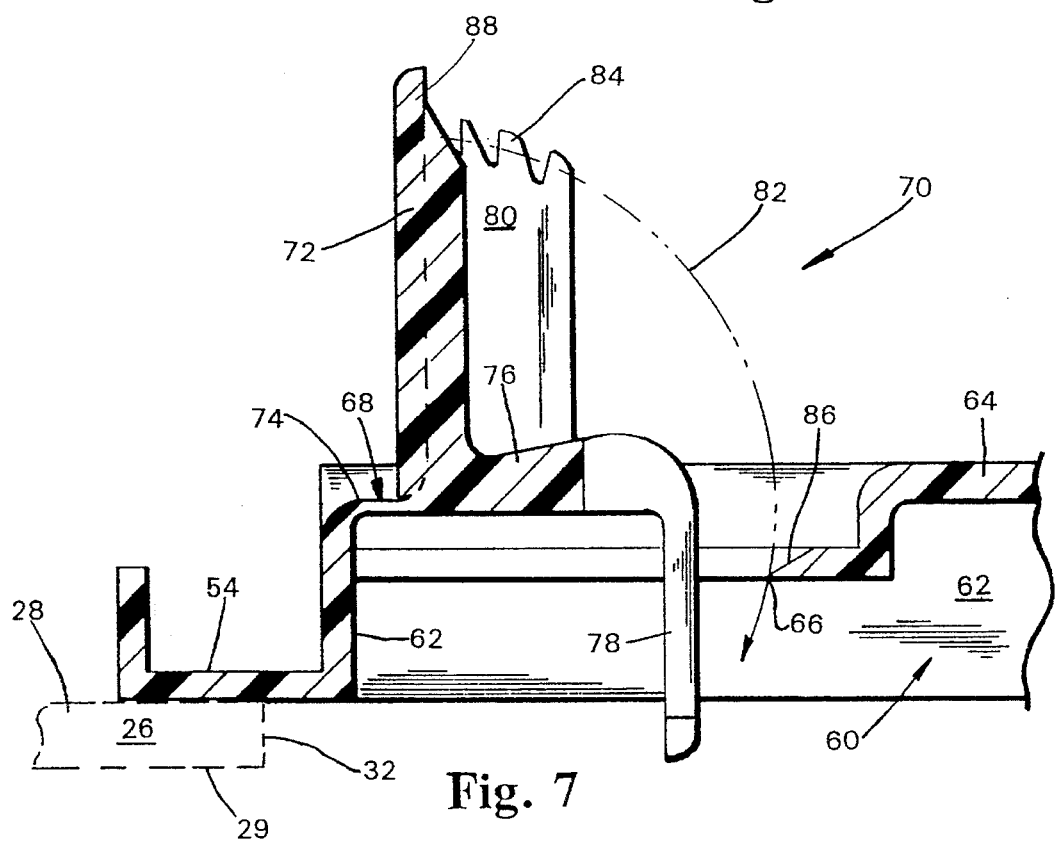
FIG. 7 is an enlarged section view of the plate taken along line VII—VII shown in FIG. 5.
Figure 6:
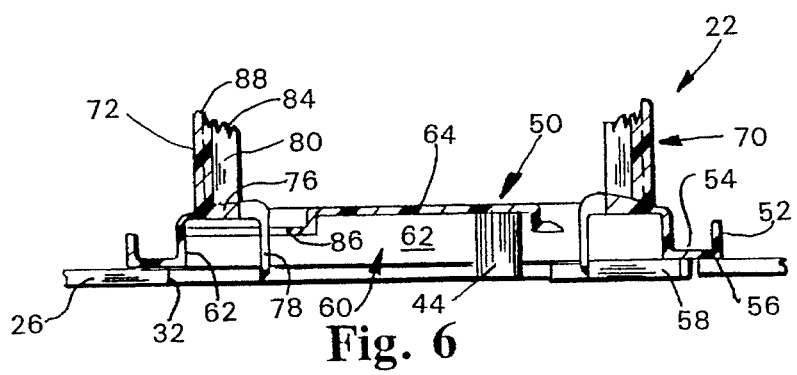
Figure 8:
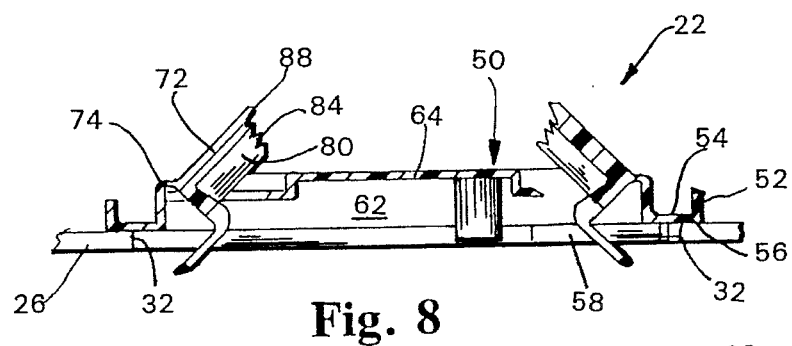
FIGS. 8 and 9 are additional section views of the plate illustrating the operation of the invention.
Figure 9:
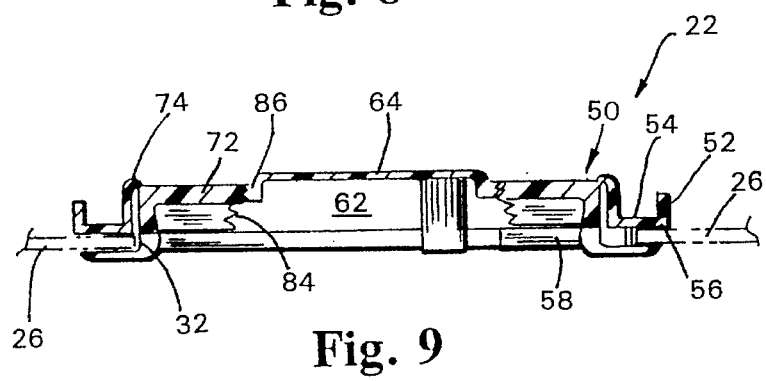
Figure 10:
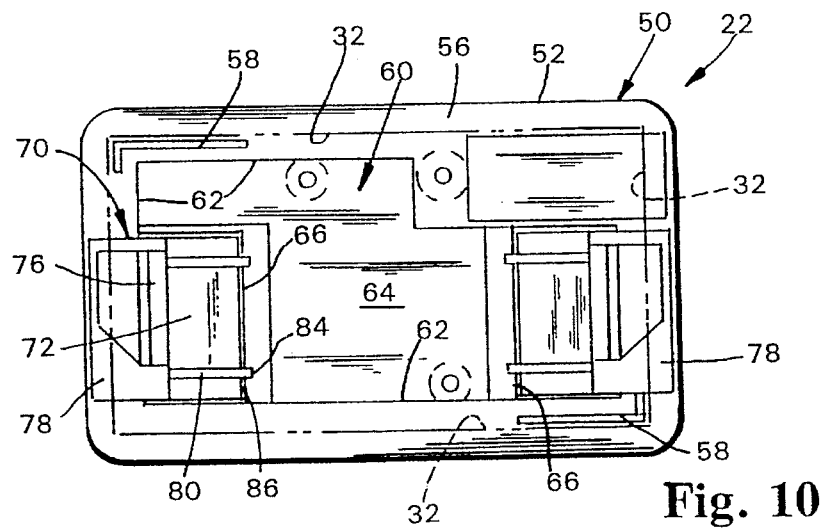
FIG. 10 is a plan view of the plate of the invention in the clamped position.

As seen in FIGS. 4 and 7, end wall 64 contains at least one, and preferably two openings 66 located toward the outer margins of interior 60 and proximate opposite walls 62 which define the outermost portion of openings 66. Disposed within each opening 66 and hinged at 68 to one sidewall 62 is a clamping means 70 adapted to swing about hinge point 74 down through opening 66 and engage an opposite surface of panel 26 to retain plate 22 against panel surface 28. Clamping means 70, best seen in FIG. 7, includes a Z-shaped clamp wherein a first actuator flange 72 has one end or edge pivotally coupled by living hinge 74 to an upper end of wall 62. Laterally offset by a dependent flange 76, extending perpendicularly from the base of flange 72, is a clamping flange or jaw 78. Integral with flanges 72 and 76, and extending perpendicular thereto, is a locking flange 80 with a curved edge 90 on an arc 82 defined by living hinge 74. A plurality of teeth 84 are defined along edge 90 and are adapted to engage, in a ratchet-like fashion, and lock with tapered edge 86 of opening 66. Once engaged past edge 86, teeth 84 prevent rotation of clamp 70 in the opposite direction. A positive stop of clamp 70 in opening 66 is achieved by tip 88 of flange 72 overlapping edge 86, locking clamp 70 and flange 72 substantially parallel with the remainder of frame 50.

Referring to FIGS. 6–10, the panel such as headliner panel 26 adapted to receive plate 22 and accessory 24 has at least one opening formed therein so that the accessory may be mounted to the plate. In a preferred embodiment, opening 32 is slightly larger than the area defined by locating tabs 58, such that locating tabs 58 fit within the opening and center plate 22. The outside surface of web 56 is placed in contact with surface 28 such that locator tabs 58 position panel 22 adjacent opening 32. The operator then activates clamp 70 by depressing flange 72 toward a centerline of the plate, from the same side of panel 26 on which the plate is mounted, causing clamp 70 to rotate about hinge 74 and extend flanges 76 and 78 through opening 32. Continued depression of flange 72, until stop 88 engages edge 86, causes flange 78 to clamp against surface 29 of panel 26 opposite surface 28. Flange 78 is locked in clamping engagement with panel 26 by teeth 84 locked with edge 86. Depending on the thickness, rigidity and/or compressibility of panel 26, the first or subsequent tooth of teeth 84 will engage edge 86. Clamping flanges 78 forced against panel surface 29, together with locating tabs 58 extending from web 56, secure plate 22 adjacent opening 32, thereby spanning the opening and adding structural support to the panel in the area of the opening. With panel 22 secured in position, a wiring harness (not shown) may be threaded through plate 22 for supplying power to accessory 24 which is then fastened to plate 22 by fasteners received in bosses 44, 44a. In the alternative, snap fasteners may be used to retain accessory 24 to plate 22.

Figure 11:
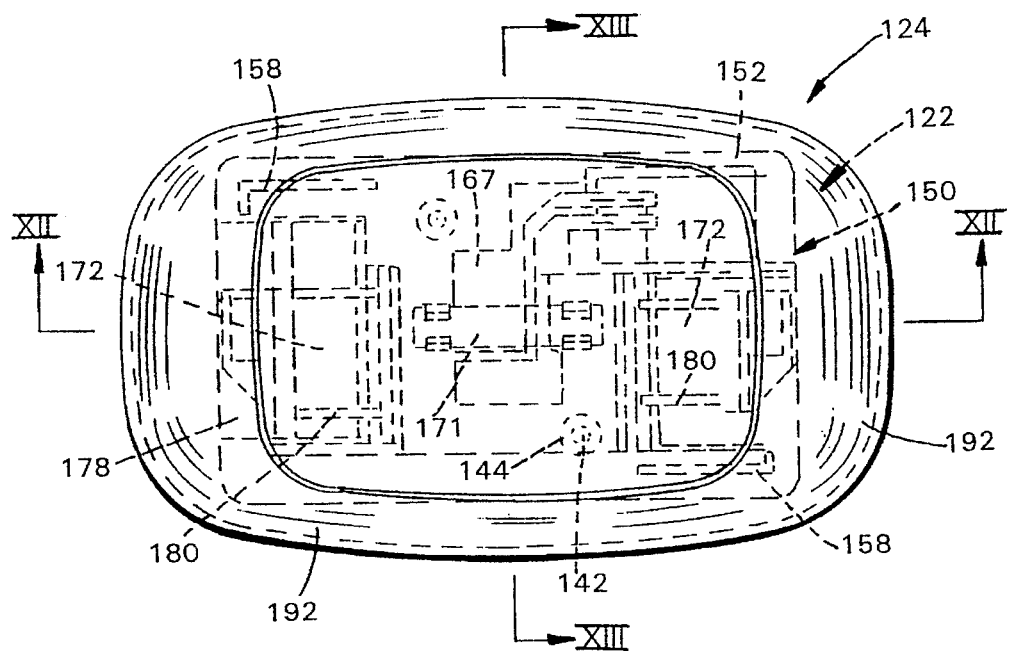
FIG. 11 is a section view of an alternate embodiment of an accessory attached to the plate of the present invention.
Figure 12:
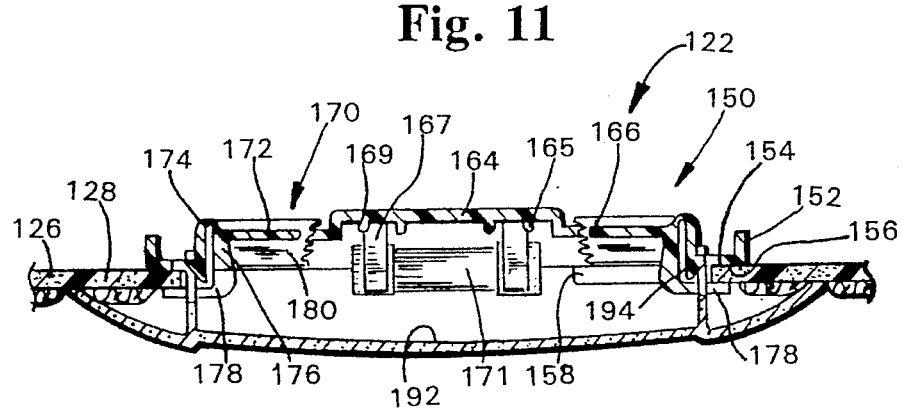
FIGS. 12 and 13 are section views of the alternate embodiment of the accessory and plate shown in FIG. 11 taken along lines XII—XII and XIII—XIII of FIG. 11, respectively.
Figure 13:
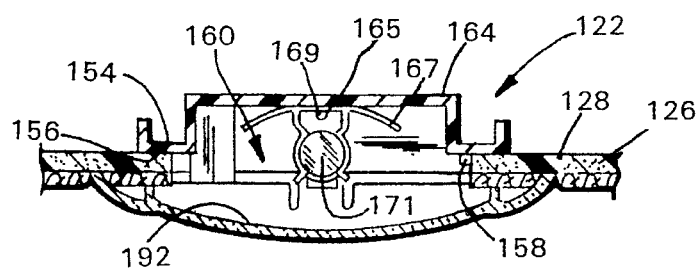

In another form of the invention 120, shown in FIGS. 11–13, accessory 124 may be formed as an integral part or component of plate 122. For example, plate 122, being substantially the same as shown in FIGS. 1–10, may be used as a housing for the accessory as well as a mounting plate which also adds structural support for that area of the panel on which it is mounted. Plate 122 includes a frame 150 having a shape and dimension to span the distance of opening 132 formed in panel 126, and lie adjacent a surface 128 surrounding hole 132. Perimeter 152 of frame 150, defined by channel 154, generally surrounds an interior recess 160 closed at one end by wall 164. Extending from end wall 164 are a plurality of small projections, nibs or teats 165 for receiving a conductive light bulb mounting bracket 167. Bracket 167 has a plurality of holes 169 of slightly smaller diameter than nibs 165 so that bracket 167 is tightly held thereon when pressed on over nibs 165. The terminal ends of bracket 167 are appropriately located to connect with leads of an electrical harness (not shown). Bracket 167 includes terminals for receiving and retaining a light bulb 171.

Just as in the previous embodiment, end wall 164 also includes openings 166 at opposite ends wherein Z-shaped clamps 170, hinged to opposite sidewalls 162, may extend therethrough. Clamps 170 are substantially similar to clamps 70 above and include an actuation flange 172, integral locking flange 180 and lateral flange 176 pivotally coupled to an upper edge of wall 162 through living hinge 174. Dependent from the free end of lateral flange 176 is clamping flange 178 adapted to engage the opposite surface of panel 126 when rotated about hinge 174. A central portion 190 of flange 178 is removed in order for a lens cap 192 to snap-fit within locking tabs 194 extending from sidewalls 162. Locating tabs 158 extending from channel web 156 into opening 132, together with clamps 170 gripping panel 126 and lens cap 192 clamped onto locking tabs 194, securely retain plate 122 with respect to opening 132.

Although the invention has been described with respect to specific preferred embodiments of the plate and accessories, many variations and modifications will become apparent to those skilled in the art. For example, mounting plate 22 may receive a coat hook, or act with another plate to retain an overhead console. In addition, such accessories could be an integral part of plate 22 such that, for example, the coat hook would depend directly from end wall 64, 164. A trim plate could then be fastened to conceal clamping flanges or jaws 78, 178. Essentially, any accessory adapted to be mounted in a panel could be retained using the mounting plate of this invention. It is, therefore, the intention that the appended claims be interpreted as broadly as possible in view of the prior art to include all such variations and modifications.

The embodiments of the invention in which an exclusive property or privilege is claimed are defined as follows.

1. A molded, unitary apparatus for attaching accessories to a panel having surfaces on opposite sides thereof, comprising:

a frame adapted to lie adjacent a surface on one side of said panel and having at least one dimension sufficient to span an opening formed in the panel;

at least one clamp pivotally coupled to said frame by a polymeric hinge and adapted to extend through said opening to engage a surface on an opposite side of the panel from the one side;

a plurality of teeth defined on one end of said clamp configured to engage said frame in a ratchet-like fashion and provide a range of locking positions of said clamp against said surface of said panel when extended through said opening for retaining said frame on the panel adjacent the panel opening; and means for coupling an accessory to said frame.

2. The apparatus of claim 1, further including means for actuating said clamp from the same side of the panel as said frame.

3. The apparatus of claim 1, wherein the accessory includes an interior light assembly.

4. The apparatus of claim 1, wherein the accessory includes a lighting terminal.

5. An apparatus for attaching accessories to a panel having surfaces on opposite sides thereof, comprising:

a frame adapted to lie adjacent a surface on one side of said panel and having at least one dimension sufficient to span an opening formed in the panel;

securing means coupled to said frame and adapted to extend through said opening engaging a surface on an opposite side of the panel from the one side and retaining said frame on the panel adjacent the panel opening, said securing means including clamping means pivotally coupled to said frame for clamping opposing surfaces of the panel adjacent an edge of the opening;

said clamping means includes a first flange having a lower edge pivotally coupled to said frame;

a second flange offset from said lower edge and dependent from said first flange for engaging the opposite surface of said panel; and a plurality of teeth on said first flange for locking said first and second flange in relation to said frame;

means for actuating said securing means from the same side of the panel as said frame: and means on said apparatus for coupling an accessory to said frame.

6. The apparatus of claim 5, wherein said first flange pivotally coupled to said frame includes a living hinge.

7. A plate for attaching an accessory to a panel, including:

a frame molded from a polymeric material and adapted to lie adjacent a first surface of the panel and span at last one aperture in the panel to receive said accessory;

at least one molded clamp coupled to said frame through a living hinge and adapted to swing through the panel aperture and engage a second surface of the panel opposite the first surface of said plate and adjacent the aperture, sandwiching the panel between said frame and said clamp;

a plurality of teeth extending from one end of said clamp for engaging said frame in a plurality of positions and locking said clamp in position against the panel; and a flange for actuating said at least one clamp from the same side of the panel on which said frame is mounted.

8. The apparatus of claim 7, further including means for coupling an accessory to said frame.

9. The apparatus of claim 8, wherein the accessory is a lighting assembly.

10. A plate for attaching an accessory to a panel, including:

a frame molded from a polymeric material and adapted to lie adjacent a first surface of the panel and span at least one aperture in the panel to receive said accessory;

at least one molded clamp coupled to said frame through a living hinge and adapted to swing through the panel aperture and engage a second surface of the panel opposite the first surface of said plate and adjacent the aperture, sandwiching the panel between said frame and said clamp; and locking means for locking said clamp in position against the panel including at least one set of teeth for engaging said frame in a ratchet-like fashion to fix said clamp in position.

11. The plate of claim 10, wherein said at least one clamp includes:

at least one jaw member adapted to rotate outwardly toward the edge of the panel aperture on said living hinge; and a flange member extending from said at least one jaw member for moving said jaw member and locking said jaw member in at least one clamped position against the panel.

12. The apparatus of claim 11, wherein said at least one set of teeth are located at one edge of said flange member.

13. The apparatus of claim 12, wherein said frame and clamp locally reinforce the panel about the aperture when the frame is located on the panel.

14. A panel assembly adapted to receive at least one accessory, comprising:

a panel having first and second generally opposing surfaces on opposite sides of said panel and at least one aperture extending through said surfaces;

a plate disposed generally parallel to said first surface and overlying said aperture;

at least one jaw extending from said plate for movement through said aperture to engage said second surface of said panel and hold said plate over said aperture;

a flange for actuating said jaw into contact with said second surface of said panel and operable from said side of said panel on which said plate is mounted; and a plurality of teeth on said flange for engaging said plate in a ratchet-like fashion, thereby locking said jaw against said second surface of said panel.

15. The panel assembly of claim 14, further including means on said plate adjacent said aperture to receive an accessory.

16. The panel assembly of claim 15, wherein said jaw is pivotally coupled to said plate by a hinge for clamping said first and second generally opposing surfaces of said panel adjacent an edge of said aperture.

17. The panel assembly of claim 15, wherein said accessory is a lighting receptacle.

18. The panel assembly of claim 15, wherein said means adapted to receive an accessory includes fastener receptacles.

19. The panel assembly of claim 15, wherein said means adapted to receive an accessory includes:

means for receiving a conductive bracket for retaining a lighting assembly; and means for receiving a light transmitting lens concealing said plate and light.

20. A panel assembly adapted to receive at least one accessory, comprising:

a panel having first and second generally opposing surfaces on opposite sides of said panel and at least one aperture extending through said surfaces;

a plate disposed generally parallel to said first surface and overlying said aperture;

at least one securing means extending from said plate through said aperture and adapted to engage said second surface to hold said plate over said aperture, said securing means including clamping means pivotally coupled to said plate for clamping said first and second generally opposing surfaces of said panel adjacent an edge of said aperture, said clamping means including:

a jaw coupled by a hinge to an interior of said plate and adapted to pivot about said hinge into said aperture and onto said second surface of said panel opposite said plate;

ratchet means for locking said jaw against said second surface of said panel, wherein said ratchet means includes a plurality of serrated teeth defined along said lever and each adapted to engage an edge defined on said plate; and means for actuating said clamping means into contact with said second surface of said panel and operable from said first side of said panel on which said plate is mounted, wherein said means for actuating said clamping means includes lever means coupled to said jaw and adapted to pivot about said hinge for actuating said jaw against said second surface of said panel; and means on said plate adjacent said aperture adapted to receive an accessory.

21. The panel assembly of claim 20, wherein said plate, clamping means, actuating means and ratchet means are molded as a single unitary component from a polymeric material.

22. An apparatus for attaching accessories to a panel, comprising:

a frame adapted to lie adjacent a surface of the panel and having at least one dimension sufficient to span an opening formed in the panel; and clamping means attached to said frame for extending through said opening in the panel and clamping an opposing surface of the panel adjacent an edge of said opening, said clamping means including a first flange pivotally coupled to said frame and actuatable from the same side of the panel as said frame, a second flange dependent from said first flange for engaging the opposite surface of said panel, and a plurality of teeth on said first flange for locking said first and second flange in relation to said frame; and means for coupling an accessory to said frame on a side adjacent the panel.

* * * * *